(12) United States Patent
Takijiri et al.

(10) Patent No.: US 10,705,545 B2
(45) Date of Patent: Jul. 7, 2020

(54) FLUID CONTROL DEVICE AND FLOW RATE RATIO CONTROL DEVICE

(71) Applicant: HORIBA STEC, Co., Ltd., Kyoto-shi, Kyoto (JP)

(72) Inventors: Kotaro Takijiri, Kyoto (JP); Yusuke Kanamaru, Kyoto (JP); Emiko Nakagawa, Kyoto (JP); Yuki Tanaka, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 16/413,312

(22) Filed: May 15, 2019

(65) Prior Publication Data
US 2019/0354120 A1  Nov. 21, 2019

(30) Foreign Application Priority Data
May 18, 2018 (JP) .................................. 2018-096639

(51) Int. Cl.
*G05D 7/06* (2006.01)
*F16K 1/54* (2006.01)
*F16K 17/02* (2006.01)
*F16K 1/52* (2006.01)

(52) U.S. Cl.
CPC ........... *G05D 7/0635* (2013.01); *F16K 1/523* (2013.01); *F16K 1/54* (2013.01); *F16K 17/025* (2013.01); *G05D 7/0652* (2013.01); *G05D 7/0664* (2013.01); *Y10T 137/7761* (2015.04)

(58) Field of Classification Search
CPC ............ Y10T 137/7761; G05D 7/0623; G05D 7/0652; G05D 7/0664; F16K 1/52; F16K 1/523; F16K 1/54

USPC ....................................................... 137/487.5
See application file for complete search history.

(56) References Cited

U.S. PATENT DOCUMENTS

| 4,052,003 A | * | 10/1977 | Steffen | ............... | A01M 7/0089 |
|---|---|---|---|---|---|
| | | | | | 239/71 |
| 4,126,540 A | * | 11/1978 | Grosboll | ............... | B01J 8/0278 |
| | | | | | 208/146 |
| 4,392,611 A | * | 7/1983 | Bachman | ............ | A01M 7/0089 |
| | | | | | 222/613 |
| 5,158,714 A | * | 10/1992 | Shih | ....................... | B01D 3/008 |
| | | | | | 261/96 |

(Continued)

FOREIGN PATENT DOCUMENTS

WO      2008072614 A1     6/2008

*Primary Examiner* — William M McCalister
(74) *Attorney, Agent, or Firm* — Alleman Hall Creasman & Tuttle LLP (57) ABSTRACT

A fluid control device is adapted to include: a valve provided in a flow path through which a fluid flows; a pressure sensor provided upstream of the valve; a flow rate sensor provided on downstream of the pressure sensor; a set flow rate generator that outputs a set flow rate corresponding to the measured pressure on the basis of a pressure-flow rate map; a valve control part that controls the opening level of the valve so that the deviation between the set flow rate and a measured flow rate decreases; and the set flow rate generator that outputs the set flow rate corresponding to the measured pressure to the valve control part. In addition, the set flow rate generator is adapted to control the set flow rate so that the measured pressure has a value up to a limit pressure.

20 Claims, 5 Drawing Sheets

(56) References Cited

U.S. PATENT DOCUMENTS

| | | | | | |
|---|---|---|---|---|---|
| 5,394,755 | A * | 3/1995 | Sudo | ............... | G01F 1/34 |
| | | | | | 73/861 |
| 5,687,092 | A * | 11/1997 | Bretmersky | ......... | G05D 7/0635 |
| | | | | | 702/100 |
| 5,942,163 | A * | 8/1999 | Robinson | ............ | F24F 6/18 |
| | | | | | 261/118 |
| 6,302,106 | B1 * | 10/2001 | Lewis | ............ | B63C 11/24 |
| | | | | | 128/204.22 |
| 8,015,995 | B2 * | 9/2011 | Brodeur | ............ | G01F 1/363 |
| | | | | | 137/487.5 |
| 8,517,353 | B2 * | 8/2013 | Bannon | ............ | B01D 3/205 |
| | | | | | 261/110 |
| 8,944,095 | B2 * | 2/2015 | Okabe | ............ | C23C 16/00 |
| | | | | | 137/486 |
| 9,477,232 | B2 * | 10/2016 | Takahashi | ......... | G05D 7/0664 |
| 2003/0130807 | A1 * | 7/2003 | Ambrosina | ......... | G01F 1/68 |
| | | | | | 702/45 |
| 2005/0005994 | A1 * | 1/2005 | Sugiyama | ......... | G05D 7/0664 |
| | | | | | 141/4 |
| 2010/0030390 | A1 * | 2/2010 | Yamaguchi | ......... | G05D 11/132 |
| | | | | | 700/285 |
| 2010/0163119 | A1 * | 7/2010 | Isobe | ............ | G01F 1/6847 |
| | | | | | 137/486 |
| 2011/0094596 | A1 * | 4/2011 | Sugiyama | ......... | G05D 7/0658 |
| | | | | | 137/14 |
| 2011/0106319 | A1 * | 5/2011 | Takahashi | ......... | G05D 7/0635 |
| | | | | | 700/282 |
| 2014/0182692 | A1 * | 7/2014 | Hirata | ............ | G05D 7/0617 |
| | | | | | 137/10 |
| 2016/0079105 | A1 * | 3/2016 | Parkhe | ............ | H01L 21/6831 |
| | | | | | 137/14 |

* cited by examiner

FLUID CONTROL DEVICE AND FLOW RATE RATIO CONTROL DEVICE

TECHNICAL FIELD

The present invention relates to a fluid control device in which pressure on the upstream side of a valve has to be kept at a limit pressure or less.

BACKGROUND ART

For example, in semiconductor manufacturing processes, gases are sometimes supplied respectively from multiple introduction ports to a deposition chamber or the like at a predetermined flow rate ratio. The introduction ports are respectively provided with flow paths, and each of the flow paths is provided with a packaged fluid control device called a mass flow controller that controls the flow rate of a fluid flowing through the flow path (see Patent Literature 1).

Meanwhile, among gases used in semiconductor manufacturing processes, one toxic to human bodies and one whose chemical properties to human bodies are not well known exist, and such gases have to be prevented from leaking outside from pipes and the like constituting flow paths.

Accordingly, in order to prevent the pressure of the gas from being increased to result in leakage on the upstream side of the above-described mass flow controller, keeping the upstream side of the mass flow controller at, for example, a limit pressure lower than atmospheric pressure is stipulated as a requirement specification.

In response to such a requirement specification, the pressure on the upstream side is configured to be kept constant at a predetermined value lower than the limit pressure by providing a pressure regulator on the upstream side of the mass flow controller in the flow path.

However, in the case where the pressure on the upstream side of the mass flow controller is configured to be kept constant at the predetermined low pressure by the pressure regulator, the flow rate of the fluid to be supplied to the mass flow controller is in a limited state. For example, when an excessive set flow rate is set in the mass flow controller in the state where the supply of the fluid is limited as described, the convergence time required for a flow rate output to converge at the set flow rate becomes longer.

CITATION LIST

Patent Literatures

Patent Literature 1: International Publication No. WO2008/072614

SUMMARY OF INVENTION

Technical Problem

The present invention has been made in consideration of the problem as described above, and intends to provide a fluid control device capable of suppressing pressure on the upstream side of a valve, for example, below a limit pressure so as to prevent leakage, as well as converging the flow rate of fluid flowing through a flow path to a set flow rate within a predetermined convergence time.

Solution to Problem

That is, the fluid control device according to the present invention has been first made by breaking free from the conventional subjective impression that the pressure of fluid supplying from an upstream side must be always fixed at a constant value lower than a limit pressure for safety, and recognizing that as long as the pressure is the limit pressure or less, even when the pressure varies, required safety specifications can be satisfied.

Specifically, the fluid control device according to the present invention includes: a valve provided in a flow path through which fluid flows; a pressure sensor provided on an upstream side of the valve; a flow rate sensor provided on a downstream side of the pressure sensor; a set flow rate generator that is inputted with a measured pressure measured by the pressure sensor and outputs a set flow rate corresponding to the measured pressure on a basis of a pressure-flow rate map; and a valve control part that is inputted with the set flow rate outputted from the set flow rate generator, and controls the opening level of the valve so that the deviation between the set flow rate and a measured flow rate measured by the flow rate sensor decreases. In addition, the set flow rate generator controls the set flow rate so that the measured pressure has a value equal to or less than a limit pressure.

In such a configuration, even when the pressure of the fluid varies on the upstream side of the valve, an appropriate set flow rate is inputted to the valve control part depending on the measured pressure measured by the pressure sensor, and therefore the pressure of the fluid on the upstream side of the valve can be suppressed to have a value equal to or less than the limit pressure. Also, by changing the set flow rate, not only the measured pressure but also the measured flow rate can be controlled, and therefore the convergence time required for a flow rate output obtained by the valve to converge to the set output can be shortened than ever before.

Accordingly, for example, while satisfying a required safety specification concerning pressure, flow rate control can be sped up.

In order to make it possible to supply a sufficient amount of the fluid to the valve and shorten the convergence time while keeping the pressure on the upstream side of the valve at a value equal to or less than the limit pressure, it is only necessary that the set flow rate generator controls the set flow rate so that the value of the measured pressure can take a value equal to or more than a predetermined pressure and equal to or less than the limit pressure.

In order to not only suppress the measured pressure to the limit pressure or less but converge the flow rate at high speed, it is only necessary that the set flow rate generator controls the set flow rate so that the convergence time required for the deviation between the set flow rate and the measured flow rate to converge within a tolerance becomes equal to or less than a predetermined time.

In order to make it possible to, even when the measured pressure that is the pressure on the upstream side of the valve varies, keep the convergence time at substantially the same degree of time length regardless of the resulting pressure value, it is only necessary that the set flow rate generator sets the value of the set flow rate to be larger as the value of the measured pressure increases.

In order to influence both the pressure on the upstream side of the valve and the flow rate obtained by the valve, and while suppressing the upstream side of the valve at the limit pressure or less, converge the obtained flow rate at high speed, it is only necessary that the measured pressure measured by the pressure sensor is one indicating the pressure of a gas reservoir formed in a flow path on the upstream side of the valve, the measured pressure is configured to change depending on the deviation between an inflow flow rate flowing into the gas reservoir from an upstream side and an outflow flow rate obtained by the valve, and the set flow rate generator is configured to output the set flow rate depending on a change in the measured pressure caused by the deviation between the inflow flow rate and the outflow flow rate to the valve control part.

Specific configuration examples for allowing the set flow rate to surely keep the pressure on the upstream side of the valve at a value equal to or less than the limit pressure include one in which the set flow rate generator includes: a map storage part that stores a pressure-flow rate map in which the set flow rate corresponding to the measured pressure is provided; and a set flow rate determination part that, on the basis of the measured pressure and the pressure-flow rate map, determines the set flow rate to be outputted to the valve control part, in which the measured flow rate and the set flow rate as a pair in the pressure-flow rate map are included in a region surrounded by a limit pressure function indicating the limit pressure in a pressure-flow rate plane having pressure and a flow rate as variables, a lowest operation pressure function indicating the lowest operation pressure at which the flow rate sensor is operable, and a maximum conductance function indicating the maximum conductance of the valve.

When the flow rate sensor is a thermal type flow rate sensor, the fluid control device according to the present invention can regulate the pressure of the fluid to have a desired value that is a value equal to or less than the limit pressure, and therefore for example, a situation where the sensitivity of the thermal type flow rate sensor is lost at near vacuum pressure can be prevented.

A specific example preferred to use the fluid control device according to the present invention is a flow rate ratio control device that controls a flow rate ratio of fluid flowing through multiple branch flow paths branching from the end of a supply gas flow path through which the fluid is supplied. In addition, the flow rate ratio control device includes: multiple fluid control devices that are provided in the respective branch flow paths and each of which is provided with a valve, a flow rate sensor, and a valve control part adapted to control the opening level of the valve so that the deviation between an inputted set flow rate and a measured flow rate by the flow rate sensor decreases; a pressure sensor provided in the supply gas flow path or on the upstream side of the valves of the respective fluid control devices in the respective branch flow paths; and a set flow rate generator that is inputted with a measured pressure measured by the pressure sensor and, on the basis of a pressure-flow rate map, outputs a set flow rate corresponding to the measured pressure. Further, the set flow rate generator includes: a target total flow rate determination part that, on the basis of the measured pressure and the pressure-flow rate map, determines a target total flow rate that has the target value of the sum of flow rates flowing through the respective branch flow paths; and a flow rate distribution part that, on the basis of the target total flow rate and the predetermined target flow rate ratio of the fluid to be flowed through the respective branch flow paths, determines a set flow rate to be inputted to a fluid control device provided in each of the branch flow paths, and the set flow rate generator controls the set flow rate so that the measured pressure has a value equal to or less than a limit pressure. In such a configuration, a convergence time required for the flow rate of the fluid flowed through the respective branch flow paths to converge can also be controlled to a predetermined time or less while suppressing the pressure of the supply gas flow path to the limit pressure or less to keep it safe.

As long as the set flow rate generator is one controlling the set flow rate so that the convergence time required for the deviation between the set flow rate and the measured flow rate to converge within a tolerance becomes equal to or less than a predetermined time, the fluid can be supplied from the respective branch flow paths at a desired total flow rate and flow rate ratio at high speed in addition to ensuring safety.

Specific configuration examples of the flow rate ratio control device according to the present invention include one in which a fluid control device provided in one branch flow path and the set flow rate generator are configured as separate bodies.

Other configuration examples of the flow rate ratio control device according to the present invention include one in which a fluid control device provided in one branch flow path further includes the set flow rate generator.

Examples concerning a position where the pressure sensor is provided include one in which the pressure sensor is provided in at least one branch flow path or the respective fluid control devices are provided with pressure sensors.

Advantageous Effects of Invention

As described above, the fluid control device according to the present invention is capable of, since the set flow rate to be set in the valve control part is changed depending on the measured pressure measured by the pressure sensor, suppressing the pressure on the upstream side of the valve to the limit pressure or less, and also shortening the convergence time required for the flow rate output obtained by the valve to converge to the set flow rate.

DESCRIPTION OF EMBODIMENTS

A fluid control device 100 according to a first embodiment of the present invention will be described with reference to FIGS. 1 to 4.

The fluid control device 100 of the first embodiment is, for example, one used to supply gas as fluid to a chamber or the like in a semiconductor manufacturing process. The gas used here is one of a type that must not be leaked outside from a pipe and the like forming a flow path for various reasons such as being toxic to human bodies and being ignitable.

Figure 1:
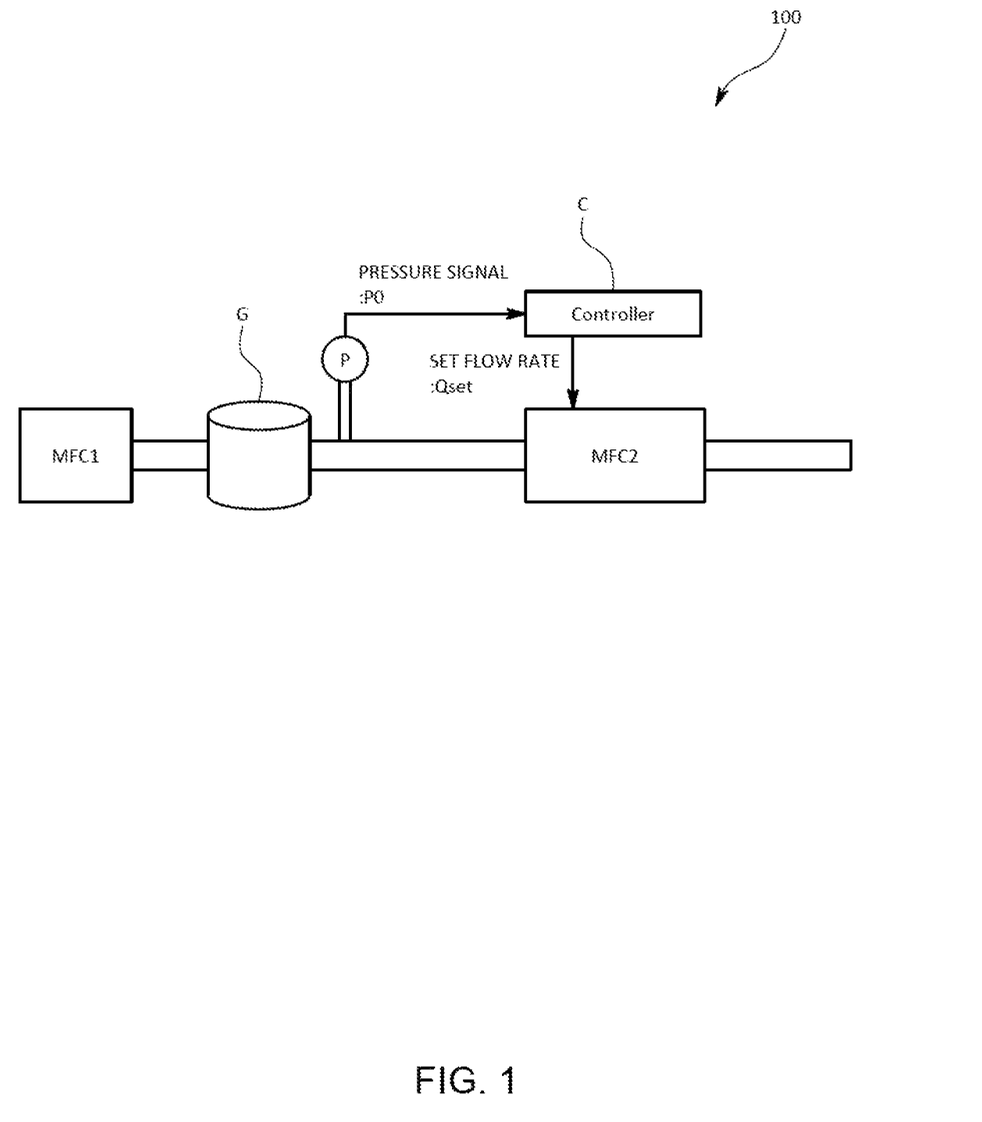
FIG. 1 is a schematic diagram illustrating the outline of a fluid control device according to a first embodiment of the present invention.

As illustrated in FIG. 1, a hardware portion constituting the fluid control device 100 of the first embodiment is provided between a first mass flow controller MFC1 serving as a gas supply source and a chamber present on the lowermost side in the flow path.

That is, the fluid control device 100 is one that, in the flow path, includes: a second mass flow controller MFC2 provided on the downstream side of the first mass flow controller MFC1; a pressure sensor P provided between the first mass flow controller MFC1 and the second mass flow controller MFC2; and a controller C that inputs a set flow rate to the second mass flow controller MFC2 on the basis of a measured pressure measured by the pressure sensor P. In other words, the first mass flow controller MFC1 does not constitute the fluid control device 100 of the first embodiment.

The flow path between the first mass flow controller MFC1 and the second mass flow controller MFC2 has volume, and therefore a gas reservoir G having a predetermined volume as illustrated typified by FIG. 1 is formed. The pressure sensor P is one that measures the pressure of the gas reservoir G.

Figure 2:
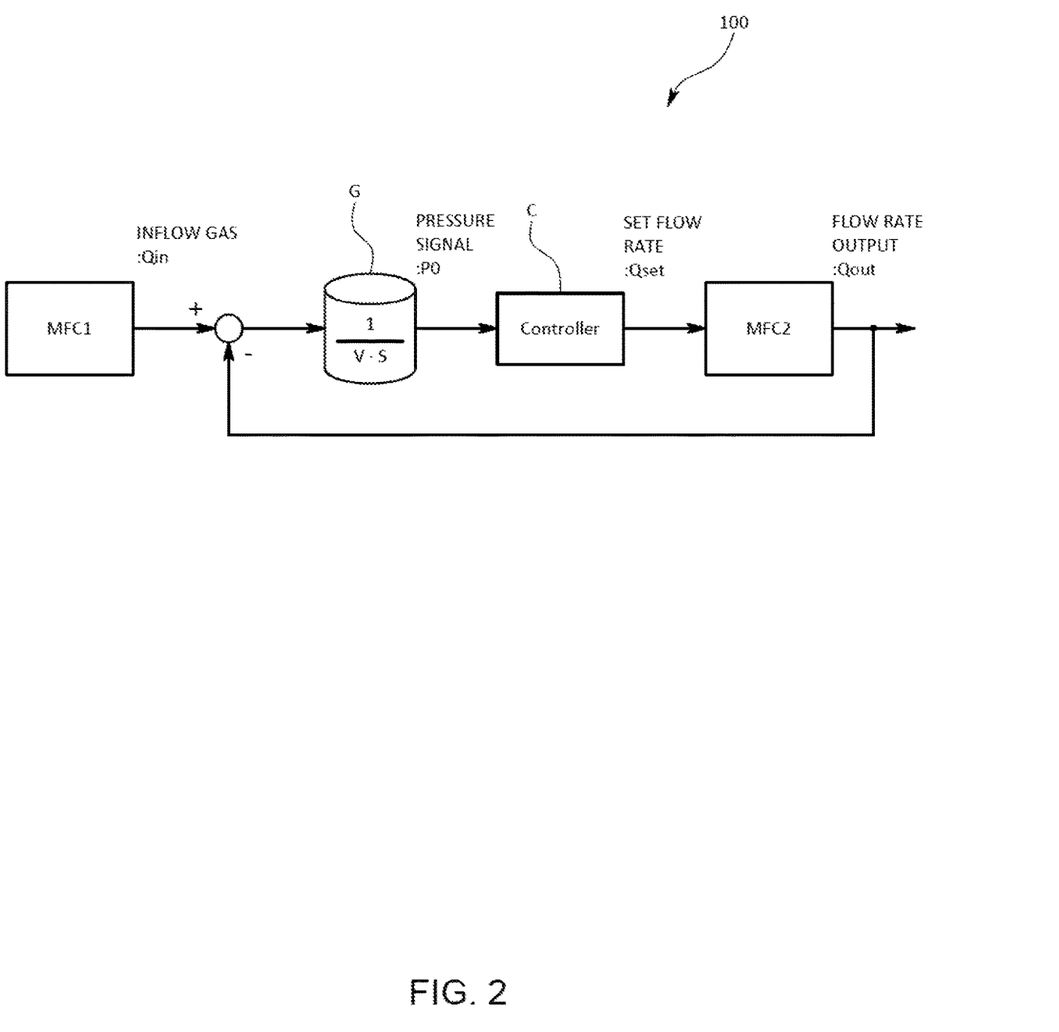
FIG. 2 is a schematic block diagram illustrating the outline of control by the fluid control device of the first embodiment.

Considering the system illustrated in FIG. 1 as a control block diagram results in a diagram as illustrated in FIG. 2. Specifically, the pressure of the gas reservoir G is determined by the difference between the flow rate $Q_{in}$ of the gas flowing from the first mass flow controller MFC1 into the gas reservoir G and a flow rate output $Q_{out}$ obtained by the second mass flow controller MFC2. The pressure of the gas reservoir G is measured by the pressure sensor P, and inputted to the controller C as a pressure signal indicating the measured pressure P0. The controller C inputs the set flow rate $Q_{set}$ corresponding to the value of the measured pressure P0 to the second mass flow controller MFC2. The second mass flow controller MFC2 outputs the flow rate output $Q_{out}$ corresponding to the set flow rate $Q_{set}$.

The controller C is one that appropriately changes the set flow rate to be set in the second mass flow controller MFC2, and controls the flow rate output $Q_{out}$ obtained by the second mass flow controller MFC2 so that the pressure of the gas reservoir G measured by the pressure sensor P is suppressed to a value lower than a limit pressure. At the same time, the set flow rate $Q_{set}$ is controlled so that the convergence time required for the deviation between the set flow rate $Q_{set}$ and the flow rate output $Q_{out}$ to converge to a tolerance becomes equal to or less than a predetermined time.

Figure 3:
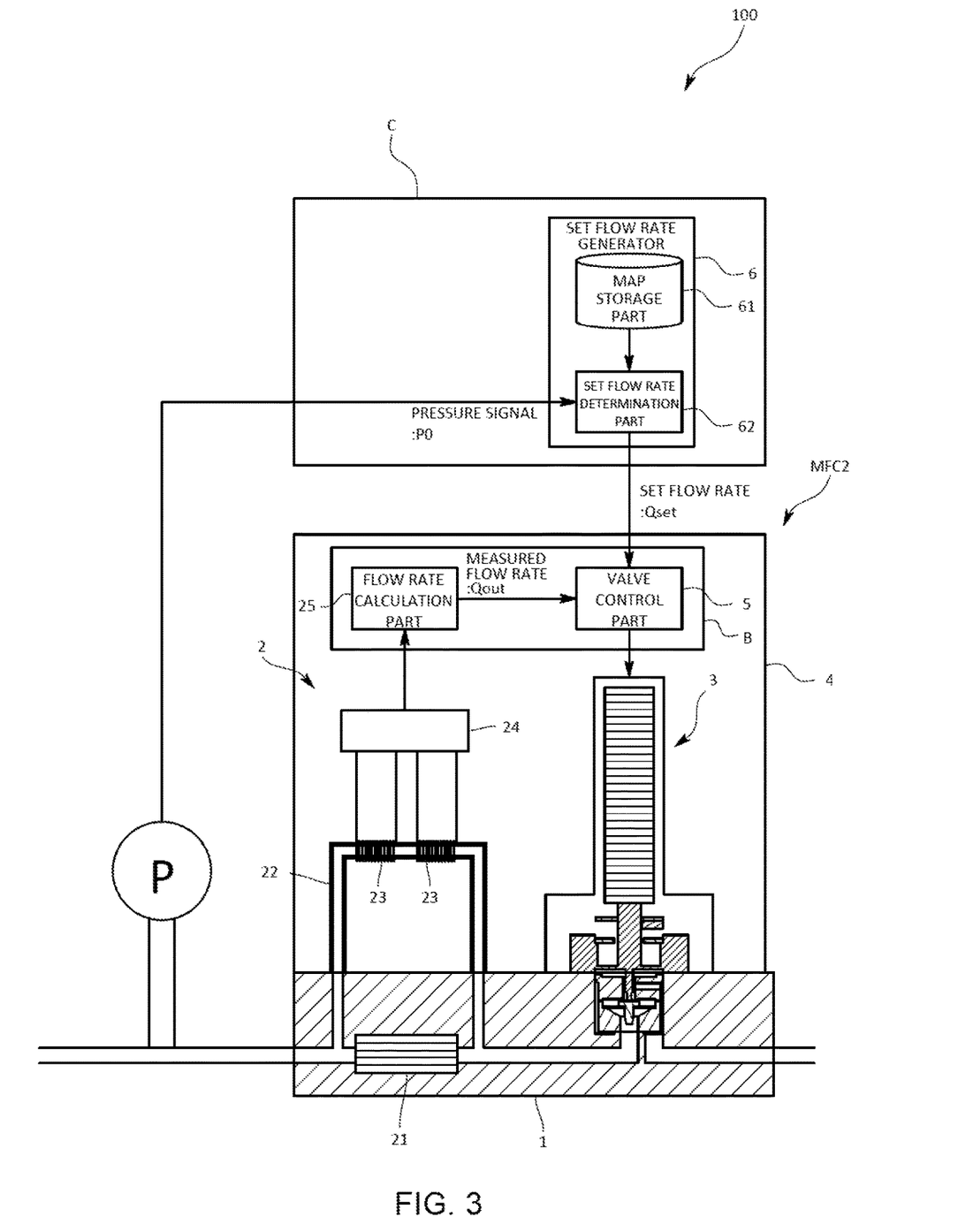
FIG. 3 is a schematic diagram illustrating the details of the fluid control device of the first embodiment.

A more detailed configuration and operation of the fluid control device 100 of the first embodiment will be described with reference to FIG. 3.

The second mass flow controller MFC2 is one including: a body 1 attached to the flow path and formed with an internal flow path; a flow rate sensor 2 and valve 3 attached to the body 1; a cover 4 attached to the body 1 so as to cover the flow rate sensor 2 and the valve 3; and a control board B provided inside the cover 4 to perform flow rate feedback control of the opening level of the valve 3. That is, the mass flow controller is one in which the various components for performing flow rate control are packaged.

The flow rate sensor 2 is a thermal type flow rate sensor, and configured to include: a flow dividing element 21 provided in the flow path; a narrow tube 22 that branches from the upstream side of the flow dividing element 21 and merges with the downstream side of the flow dividing element 21; two electric heating coils 23 that are wound on the narrow tube 22 and respectively applied with voltages so as to be kept at constant temperatures; a detection circuit 24 that detects the difference between the voltages applied to the respective electric heating coils 23; and flow rate calculation part 25 that, on the basis of the output of the detection circuit 24, calculates the flow rate of the gas flowing through the flow path.

The valve 3 is, for example, a piezo valve 3, and the opening level thereof is controlled by applied voltage.

The control board B is a computer including a CPU, a memory, an A/D converter, a D/A converter, and various input/output means, and the functions thereof as a controller are implemented by executing a mass flow controller program stored in the memory to cooperate with various devices. That is, the control board B fulfills at least functions as the above-described flow rate calculation part 25 and a valve control part 5.

The valve control part 5 controls the opening level of the valve 3 on the basis of the set flow rate inputted from outside and the measured flow rate measured by the flow rate sensor 2. More specifically, the valve control part 5 changes the applied voltage to the valve 3 to change the opening level of the valve 3 so that the deviation between the set flow rate and the measured flow rate decreases. In the first embodiment, the set flow rate is set to a value outputted from the controller C.

As described, the second mass flow controller MFC2 is formed with a flow rate feedback system and forms a minor loop in the fluid control device 100.

Next, the details of the controller C will be described.

The controller C is configured as a separate body from the second mass flow controller MFC2, and the functions thereof are implemented by a computer including a CPU, a memory, an A/D converter, a D/A converter, and various input/output means. The controller C fulfills at least a function as a set flow rate generator 6 by executing a program stored in the memory to make various devices cooperate.

The set flow rate generator 6 is inputted with the measured pressure measured by the pressure sensor P and outputs the set flow rate corresponding to the measured pressure to the valve control part 5 of the second mass flow controller MFC2. More specifically, the set flow rate generator 6 refers to a pressure-flow rate map in which set flow rates corresponding to measured pressure values are provided, and outputs the set flow rate corresponding to the measured pressure measured by the pressure sensor P.

That is, the set flow rate generator 6 includes: a map storage part 61 that stores the pressure-flow rate map; and a set flow rate determination part 62 that, on the basis of the measured pressure and the pressure-flow rate map, determines the set flow rate to be set in the second mass flow controller MFC2.

Here, the details of the pressure-flow rate map will be described with reference to a graph of FIG. 4.

The pressure-flow rate map is a one-dimensional map that when some measured pressure value is measured by the pressure sensor P, provides a set flow rate value capable of simultaneously satisfying multiple control conditions. In the first embodiment, set flow rates corresponding to respective measured pressures are experimentally obtained and determined so as to simultaneously satisfy four control conditions. The four control conditions are: (a) the pressure of the gas reservoir G must be equal to or less than the limit pressure, (b) the valve 3 must be fully closed, and after the start of flow rate control at the set flow rate in a state where the flow rate output of the second mass flow controller MFC2 is zero, the convergence time required for the deviation between the set flow rate and the measured flow rate corresponding to the flow rate output to converge within the tolerance must be able to be made equal to or less than the predetermined value, (c) a set flow rate corresponding to a measured pressure value must have a value not exceeding the maximum conductance of the valve 3, and (d) pressure at which the operation of the thermal type flow rate sensor is ensured must be kept in the second mass flow controller MFC2. In the first embodiment, in order to prevent gas leakage, the limit pressure set upon request for safety is set to, for example, 400 Torr that is a lower value than atmospheric pressure. Also, the tolerance stipulated from the flow rate control requirement specification is ±2% of the set flow rate, and the convergence time is set to, for example, 1 sec.

The pressure-flow rate map is created by obtaining set flow rate values corresponding to multiple measured pressure values as pairs through experiment or simulation so as to simultaneously satisfy these control conditions (a) to (d) as described above.

The pressure-flow rate map may be in a table format consisting of pairs of a measured pressure and a set flow rate, or may be, for example, a function having a measured pressure as input variable and a set flow rate as an output variable.

Figure 4:
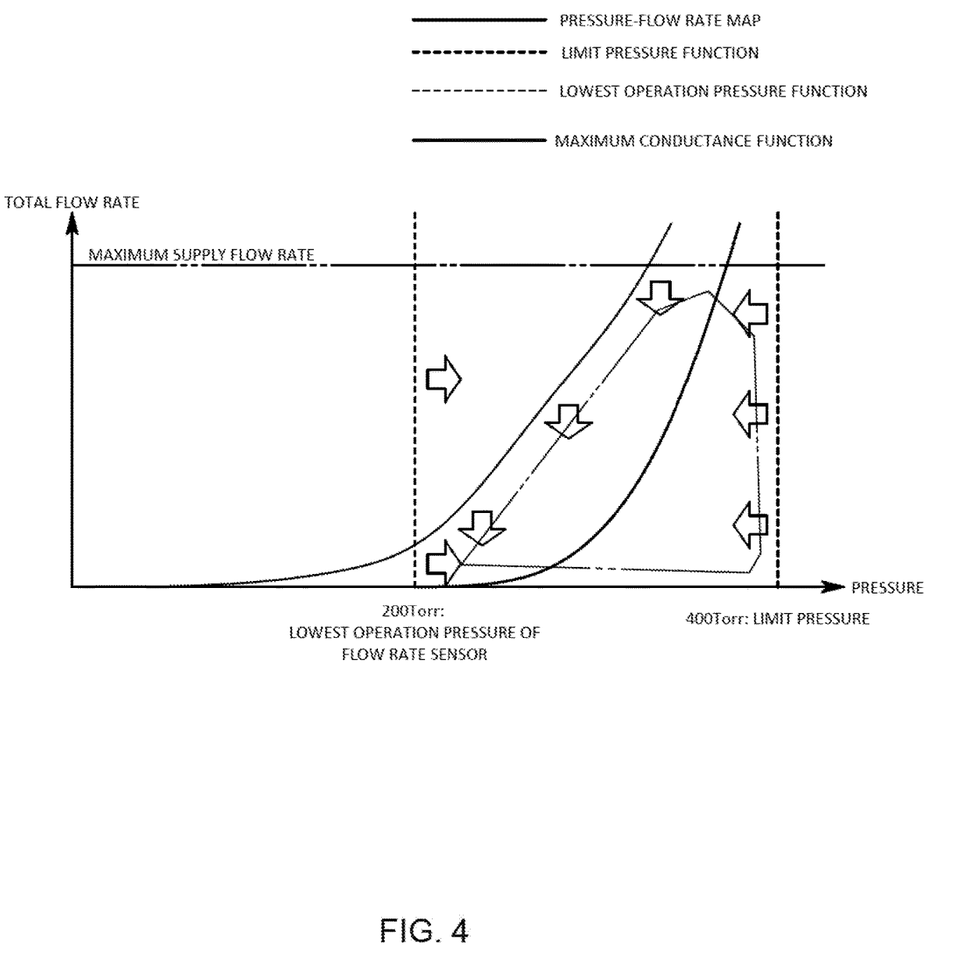
FIG. 4 is a schematic graph illustrating the relationship between a characteristic map and characteristic functions in the fluid control device of the first embodiment.

As illustrated in the graph of FIG. 4, the pressure-flow rate map graph plotted in the pressure-flow rate plane is set so as to be included a region surrounded by a limit pressure function indicating the limit pressure, a lowest operation pressure function indicating the lowest operation pressure at which the flow rate sensor 2 is operable, a maximum conductance function indicating the maximum conductance of the valve 3 with respect to each pressure, and a supply upper limit function indicating the maximum supply flow rate of the first mass flow controller MFC1.

As indicated by the pressure-flow rate map graph, within a range where the measured pressure is lower than the limit pressure, as the value of the measured pressure increases, a larger value is also set in the second mass flow controller MFC2 as the set flow rate.

The fluid control device 100 of the first embodiment configured as described above can set, on the basis of the pressure-flow rate map, the set flow rate capable of satisfying the multiple control conditions in the second mass flow controller MFC2 depending on the measured pressure that is the pressure of the gas reservoir G formed on the upstream side of the second mass flow controller MFC2.

That is, even when the pressure of the gas reservoir G varies, a set flow rate corresponding to the resulting pressure is set, and therefore the flow rate of the gas flowing into the gas reservoir G and the flow rate of the gas flowing out through the second mass flow controller MFC2 can be balanced, while the pressure of the gas reservoir G can be suppressed to a pressure lower than 400 Torr, which is the limit pressure, and kept at a constant value.

Specifically, as illustrated in the control block diagram of FIG. 2, the measured pressure measured by the pressure sensor P varies depending on the difference between the inflow flow rate of the gas flowing from the first mass flow controller MFC1 into the gas reservoir G and the outflow flow rate of the gas obtained by the second mass flow controller MFC2. As a result, the set flow rate corresponding to the varied pressure of the gas reservoir G is appropriately changed on the basis of the pressure-flow rate map every period by the set flow rate generator 6 of the controller C. For this reason, even when the pressure of the gas reservoir G varies, every time the control loop illustrated in FIG. 2 is repeated, an appropriate set flow rate is selected, and therefore the control accuracy of pressure and flow rate is increased.

It is not that the pressure of the gas reservoir G is kept constant at a predetermined pressure by a pressure regulator as conventional, but that the pressure of the gas reservoir G can be varied and kept at various values that are equal to or more than the operable pressure of the flow rate sensor 2 and equal to or less than the limit pressure. In addition, since a pressure regulator is not present, even when a gas species is changed, the change can be made difficult to affect the variation of the valve 3 of the second mass flow controller MFC2.

Further, since on the basis of the pressure-flow rate characteristic map, when the supply pressure of the gas is low, the set flow rate can be made small, whereas when the supply pressure of the gas is high, the set flow rate can be set to be large, regardless of a variation in the supply pressure of the gas, the convergence time of the flow rate output of the second mass flow controller MFC2 can be set to a short period of time like one second or less, which is the predetermined time.

Figure 5:
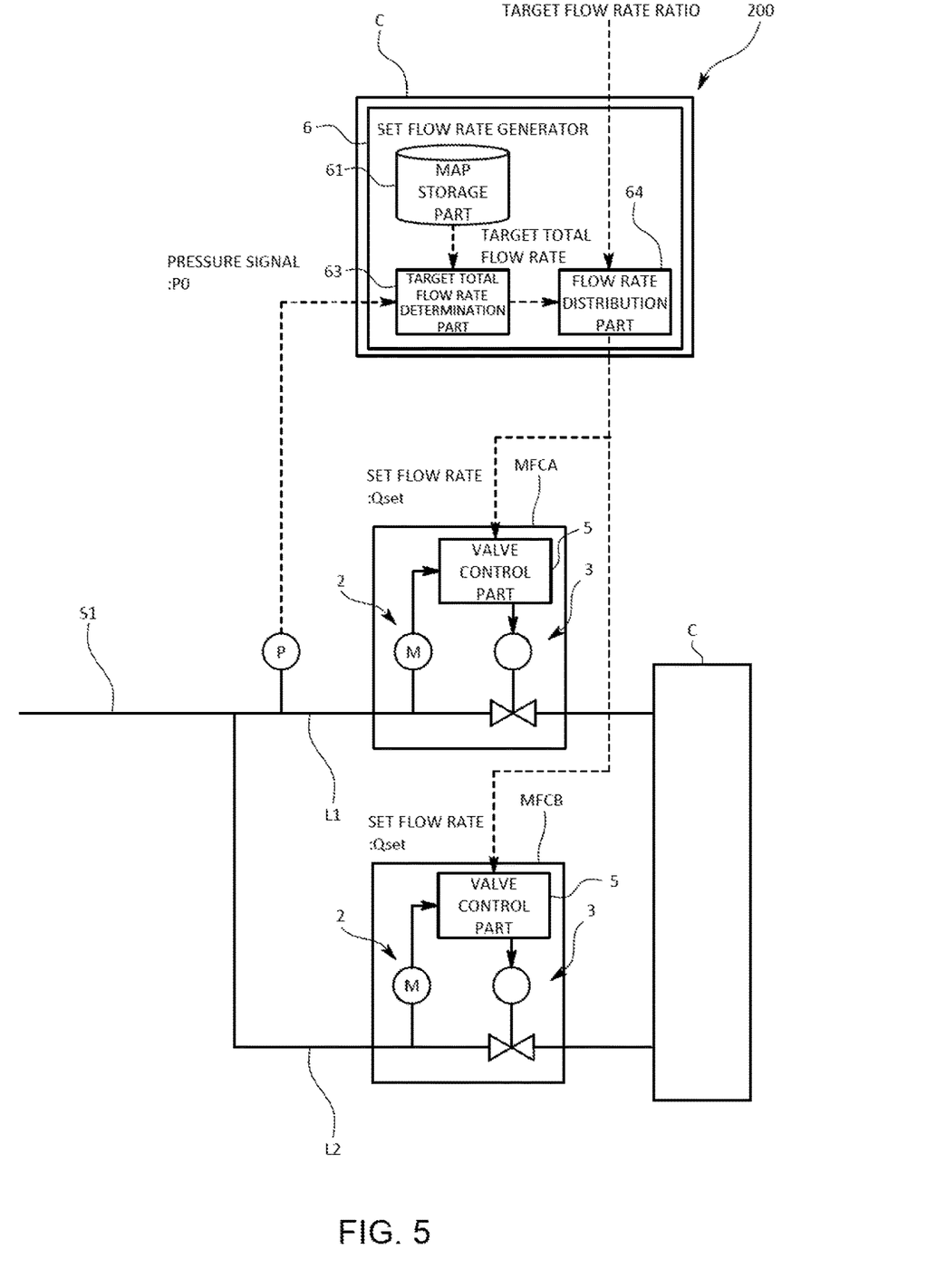
FIG. 5 is a schematic diagram illustrating a flow rate ratio control device according to a second embodiment of the present invention.

Next, a flow rate ratio control device 200 according to a second embodiment of the present invention will be described with reference to FIG. 5.

The flow rate ratio control device 200 of the second embodiment is one that controls the flow rate ratio of fluid flowing through branch flow paths L1 and L2 branching from the end of a supply gas flow path S1 on an upstream side, as well as controls pressure on the upstream side in the supply gas flow path S1 to a limit pressure or less.

That is, the flow rate ratio control device 200 includes: mass flow controllers MFC respectively provided in the branch flow paths L1 and L2; a controller C that sets set flow rates in the respective mass flow controllers MFC; and a pressure sensor P provided in the supply gas flow path S1 or on the upstream side of the respective mass flow controllers MFC. In the following, description will be given while taking the case of two branch flow paths L1 and L2 as an example; however, the flow rate ratio control device 200 may be provided with many more branch flow paths. Also, for the simplicity of description, the mass flow controller provided on the upper side of FIG. 5 is also referred to as MFCA, the branch flow path provided with MFCA as a first branch flow path L1, the mass flow controller provided on the lower side of FIG. 5 as MFCB, and the branch flow path provided with MFCB as a second branch flow path L2.

Note that the pressure sensor P, MFCA, and a map storage part 61 and set flow rate determination part 62 of a set flow rate generator 6 have substantially the same configurations as those in the fluid control device 100 described in the first embodiment. That is, on the basis of a measured pressure measured by the pressure sensor P and a pressure-flow rate map, the set flow rate generator 6 changes the set flow rates to be set in valve control parts 5 of MFCA and MFCB so that pressures on the upstream sides of MFCA and MFCB becomes equal to a limit pressure and also the convergence time required for the total flow rate, which is the sum of flow rates respectively supplied from the first branch flow path L1 and the second branch flow path L2, to converge to a target value becomes equal to or less than a predetermined time.

The specific configuration of the set flow rate generator 6 will be described. The set flow rate generator 6 includes: the map storage part 61 that stores the pressure-flow rate map; a target total flow rate determination part 63 that determined the target total flow rate of the gas to be supplied to the controller C from the respective branch flow paths L1 and L2; and a flow rate distribution part 64 that, on the basis of the determined target total flow rate and a target flow rate ratio set by a user, determines the set flow rates to be set in the respective mass flow controllers.

In the first embodiment, the pressure-flow rate map provides the relationship between pressure and the flow rate of the gas flowing through the one flow path; however, in the second embodiment, the pressure-flow rate map is one providing the relationship between a measured pressure on the upstream side of the respective mass flow controllers and the target total flow rate that is the target value of the sum of the flow rates of the fluid flowing through the respective branch flow paths L1 and L2. That is, a measured pressure measured by the pressure sensor P, and a target total flow rate allowing the measured pressure to be suppressed to the limit pressure or less are stored as a pair. In addition, an idea of a region including pairs of a measured flow rate and a target total flow rate is the same as that in the first embodiment, and therefore description thereof is omitted. Also, the target total flow rate determination part 63 refers to such a pressure-flow rate map on the basis of a measured pressure measured at the time, and determines the target total flow rate.

When the target total flow rate is determined, the flow rate distribution part 64 calculates, on the basis of the target total flow rate and the target flow rate ratio, the set flow rates to be set in the respective mass flow controllers, and inputs the calculated values to the respective mass flow controllers. In addition, the target total flow rate corresponding to the measured pressure at the time is changed every control period, and further the set flow rates to be set in the respective mass flow controllers are also changed.

By setting the individual set flow rates in the respective mass flow controllers as described above, the flow rate ratio of the fluid flowing through the respective branch flow path L1 and L2 is controlled to become equal to the target flow rate ratio, and also the upstream side of the respective mass flow controllers can be brought into a lower pressure state than the limit pressure.

Other embodiments will be described.

The fluid control device is not limited to one obtained by combining the pressure sensor and the mass flow controller, but may be configured by providing a valve and a flow rate sensor as single bodies in place of the mass flow controller.

The control board and the controller may be configured to be integrated into one computer to perform various types of calculation and control.

The flow rate sensor is not limited to the thermal type flow rate sensor but may be a pressure type flow rate sensor. Also, a position where the flow rate sensor is provided may be on any of the upstream and downstream sides of the valve.

The limit pressure and the convergence time may be appropriately set to various values depending on required specifications or the like. Also, an example of setting the pressure-flow rate map is not limited to one described in the embodiment. A set pressure corresponding to a measured pressure is only required to be set so as to be included in a region determined by respective control conditions.

The flow rate ratio control device described in the second embodiment may be one such that the respective mass flow controllers are provided with pressure sensors. Also, one mass flow controller may be one provided with functions as the set flow rate generator and the flow rate distribution part. That is, the controller described in the second embodiment is not provided as a separate body from the mass flow controllers, but may be integrated with a mass flow controller.

Besides, various combinations and modifications of the embodiments may be made without departing from the scope of the present invention.

LIST OF REFERENCE CHARACTERS

100: Fluid control device
P: Pressure sensor
2: Flow rate sensor
3: Valve
5: Valve control part
6. Set flow rate generator
61: Map storage part
62: Set flow rate determination part
63: Target total flow rate determination part
64: Flow rate distribution part

The invention claimed is:

1. A fluid control device comprising:
a valve provided in a flow path through which fluid flows;
a pressure sensor provided on an upstream side of the valve;
a flow rate sensor provided on a downstream side of the pressure sensor;
a set flow rate generator that is inputted with a measured pressure measured by the pressure sensor and outputs a set flow rate corresponding to the measured pressure on a basis of a pressure-flow rate map; and
a valve control part that is inputted with the set flow rate outputted from the set flow rate generator, and controls an opening level of the valve so that a deviation between the set flow rate and a measured flow rate measured by the flow rate sensor decreases, wherein
the set flow rate generator controls the set flow rate so that the measured pressure has a value equal to or less than a limit pressure.

2. The fluid control device according to claim 1, wherein the set flow rate generator controls the set flow rate so that a value of the measured pressure can take a value equal to or more than a predetermined pressure and equal to or less than the limit pressure.

3. The fluid control device according to claim 1, wherein the set flow rate generator controls the set flow rate so that a convergence time required for a deviation between the set flow rate and the measured flow rate to converge within a tolerance becomes equal to or less than a predetermined time.

4. The fluid control device according to claim 1, wherein the set flow rate generator sets a value of the set flow rate to be larger as a value of the measured pressure increases.

5. The fluid control device according to claim 1, wherein the measured pressure measured by the pressure sensor is one indicating pressure of a gas reservoir formed in a flow path on the upstream side of the valve,
the measured pressure is configured to change depending on a deviation between an inflow flow rate flowing into the gas reservoir from an upstream side and an outflow flow rate obtained by the valve, and
the set flow rate generator is configured to output the set flow rate depending on a change in the measured pressure to the valve control part, the change being caused by the deviation between the inflow flow rate and the outflow flow rate.

6. The fluid control device according to claim 1, wherein the set flow rate generator comprises:
a map storage part that stores a pressure-flow rate map in which the set flow rate corresponding to the measured pressure is provided; and
a set flow rate determination part that, on a basis of the measured pressure and the pressure-flow rate map, determines the set flow rate to be outputted to the valve control part, wherein
the measured flow rate and the set flow rate as a pair in the pressure-flow rate map are included in a region surrounded by a limit pressure function indicating the limit pressure in a pressure-flow rate plane having pressure and a flow rate as variables, a lowest operation pressure function indicating a lowest operation pressure at which the flow rate sensor is operable, and a maximum conductance function indicating a maximum conductance of the valve.

7. The fluid control device according to claim 6, wherein the flow rate sensor is a thermal type flow rate sensor.

8. The fluid control device according to claim 1, wherein the set flow rate generator controls the set flow rate so that a value of the measured pressure can take a value equal to or more than a predetermined pressure and equal to or less than the limit pressure, and
the set flow rate generator controls the set flow rate so that a convergence time required for a deviation between the set flow rate and the measured flow rate to converge within a tolerance becomes equal to or less than a predetermined time.

9. The fluid control device according to claim 8, wherein the measured pressure measured by the pressure sensor is one indicating pressure of a gas reservoir formed in a flow path on the upstream side of the valve,
the measured pressure is configured to change depending on a deviation between an inflow flow rate flowing into the gas reservoir from an upstream side and an outflow flow rate obtained by the valve, and
the set flow rate generator is configured to output the set flow rate depending on a change in the measured pressure to the valve control part, the change being caused by the deviation between the inflow flow rate and the outflow flow rate.

10. The fluid control device according to claim 8, wherein the set flow rate generator comprises:
a map storage part that stores a pressure-flow rate map in which the set flow rate corresponding to the measured pressure is provided; and
a set flow rate determination part that, on a basis of the measured pressure and the pressure-flow rate map, determines the set flow rate to be outputted to the valve control part, wherein
the measured flow rate and the set flow rate as a pair in the pressure-flow rate map are included in a region surrounded by a limit pressure function indicating the limit pressure in a pressure-flow rate plane having pressure and a flow rate as variables, a lowest operation pressure function indicating a lowest operation pressure at which the flow rate sensor is operable, and a maximum conductance function indicating a maximum conductance of the valve.

11. The fluid control device according to claim 10, wherein
the measured pressure measured by the pressure sensor is one indicating pressure of a gas reservoir formed in a flow path on the upstream side of the valve,
the measured pressure is configured to change depending on a deviation between an inflow flow rate flowing into the gas reservoir from an upstream side and an outflow flow rate obtained by the valve, and
the set flow rate generator is configured to output the set flow rate depending on a change in the measured pressure to the valve control part, the change being caused by the deviation between the inflow flow rate and the outflow flow rate.

12. A flow rate ratio control device that controls a flow rate ratio of fluid flowing through multiple branch flow paths branching from an end of a supply gas flow path through which the fluid is supplied, the flow rate ratio control device comprising:
multiple fluid control devices that are respectively provided in the respective branch flow paths and each of which is provided with a valve, a flow rate sensor, and a valve control part adapted to control an opening level of the valve so that a deviation between an inputted set flow rate and a measured flow rate by the flow rate sensor decreases;
a pressure sensor provided in the supply gas flow path or on an upstream side of the valves of the respective fluid control devices in the respective branch flow paths; and
a set flow rate generator that is inputted with a measured pressure measured by the pressure sensor and, on a basis of a pressure-flow rate map, outputs a set flow rate corresponding to the measured pressure, wherein
the set flow rate generator comprises:
a target total flow rate determination part that, on a basis of the measured pressure and the pressure-flow rate map, determines a target total flow rate that has a target value of a sum of flow rates flowing through the respective branch flow paths; and
a flow rate distribution part that, on a basis of the target total flow rate and a predetermined target flow rate ratio of the fluid to be flowed through the respective branch flow paths, determines a set flow rate to be inputted to a fluid control device provided in each of the branch flow paths, and
the set flow rate generator controls the set flow rate so that the measured pressure has a value equal to or less than a limit pressure.

13. The flow rate ratio control device according to claim 12, wherein
the set flow generator controls the set flow rate so that a convergence time required for a deviation between the set flow rate and a corresponding measured flow rate to converge within a tolerance becomes equal to or less than a predetermined time.

14. The flow rate ratio control device according to claim 12, wherein
a fluid control device provided in one branch flow path and the set flow rate generator are configured as separate bodies.

15. The flow rate ratio control device according to claim 12, wherein
a fluid control device provided in one branch flow path further comprises the set flow rate generator.

16. The flow rate ratio control device according to claim 12, wherein
the pressure sensor is provided in at least one branch flow path or the respective fluid control devices are provided with pressure sensors.

17. The flow rate ratio control device according to claim 12, wherein
the set flow generator controls the set flow rate so that a convergence time required for a deviation between the set flow rate and a corresponding measured flow rate to converge within a tolerance becomes equal to or less than a predetermined time, and
a fluid control device provided in one branch flow path and the set flow rate generator are configured as separate bodies.

18. The flow rate ratio control device according to claim 17, wherein the pressure sensor is provided in at least one branch flow path or the respective fluid control devices are provided with pressure sensors.

19. The flow rate ratio control device according to claim 12, wherein the set flow generator controls the set flow rate so that a convergence time required for a deviation between the set flow rate and a corresponding measured flow rate to converge within a tolerance becomes equal to or less than a predetermined time, and a fluid control device provided in one branch flow path further comprises the set flow rate generator.

20. The flow rate ratio control device according to claim 19, wherein the pressure sensor is provided in at least one branch flow path or the respective fluid control devices are provided with pressure sensors.

* * * * *